(12) United States Patent
Rottmerhusen

(10) Patent No.: US 8,704,468 B2
(45) Date of Patent: Apr. 22, 2014

(54) ELECTRODYNAMIC BRAKING DEVICE FOR A UNIVERSAL MOTOR

(75) Inventor: Hans Hermann Rottmerhusen, Tellingstedt (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 13/254,647

(22) PCT Filed: Mar. 1, 2010

(86) PCT No.: PCT/DE2010/000228
§ 371 (c)(1),
(2), (4) Date: Dec. 22, 2011

(87) PCT Pub. No.: WO2010/099787
PCT Pub. Date: Sep. 10, 2010

(65) Prior Publication Data
US 2012/0091932 A1    Apr. 19, 2012

(30) Foreign Application Priority Data

Mar. 3, 2009   (DE) .......................... 10 2009 011 448
Apr. 21, 2009  (DE) .......................... 10 2009 018 238

(51) Int. Cl.
*H02P 3/22* (2006.01)
(52) U.S. Cl.
USPC ............. 318/381; 318/362; 318/612; 318/56; 318/400.09; 318/703
(58) Field of Classification Search
USPC ................. 318/381, 362–369, 380, 612–614, 318/56–57, 61–63, 86–88, 134, 400.09, 318/703, 741, 742, 757–765, 273
See application file for complete search history.

(56) References Cited

U.S. PATENT DOCUMENTS

| | | | |
|---|---|---|---|
| 5,552,686 A | 9/1996 | Schmid et al. | |
| 5,708,333 A | 1/1998 | Kirn | |
| 5,789,885 A | 8/1998 | Seel | |
| 5,861,724 A | 1/1999 | Ackerson | |
| 5,969,303 A | 10/1999 | Piserchia et al. | |
| 6,013,993 A * | 1/2000 | Barbisch | 318/379 |
| 6,236,173 B1 | 5/2001 | Meyer | |
| 6,448,727 B1 * | 9/2002 | Rotterhusen | 318/375 |
| 6,680,596 B1 | 1/2004 | Decicco | |
| 6,998,804 B2 * | 2/2006 | Meyer et al. | 318/362 |
| 7,071,645 B2 * | 7/2006 | Hahn et al. | 318/379 |
| 7,075,257 B2 | 7/2006 | Carrier et al. | |
| 8,026,680 B2 * | 9/2011 | Tieu | 318/367 |
| 2008/0077285 A1 | 3/2008 | Kumar et al. | |

FOREIGN PATENT DOCUMENTS

| | | |
|---|---|---|
| CN | 1243359 | 2/2000 |
| DE | 2842145 A1 | 4/1980 |
| DE | 3428032 | 1/1986 |
| DE | 3825835 A1 | 2/1990 |

(Continued)

*Primary Examiner* — Eduardo Colon Santana
*Assistant Examiner* — Said Bouziane
(74) *Attorney, Agent, or Firm* — Michael Best & Friedrich LLP

(57) ABSTRACT

An electrodynamic braking device for a universal motor is proposed, wherein during a braking operation a field winding is supplied from a network, and an armature is directly short-circuited, and a braking operation is carried out using a program of a controller of a control electronics system, whereby good braking is achieved with relatively low brush wear. Such an electrodynamic braking device is advantageously applied in a power tool equipped with a dangerous tool.

13 Claims, 5 Drawing Sheets

(56) References Cited

FOREIGN PATENT DOCUMENTS

| | | |
|---|---|---|
| DE | 19540740 C1 * | 8/1996 |
| DE | 19860262 | 7/2000 |
| EP | 0352419 | 1/1990 |
| EP | 1044921 A2 | 10/2000 |
| JP | 60118074 A * | 6/1985 |
| JP | 2008182821 A * | 8/2008 |
| WO | WO 8400450 A1 * | 2/1984 |
| WO | 9103869 | 3/1991 |
| WO | WO 9509477 A1 * | 4/1995 |
| WO | 2005031963 | 4/2005 |

\* cited by examiner

ELECTRODYNAMIC BRAKING DEVICE FOR A UNIVERSAL MOTOR

BACKGROUND OF THE INVENTION

The invention relates to an electrodynamic braking device for a universal motor.

Various embodiments of electrodynamic braking devices are known.

DE 38 25 835 A1 describes an electrical braking apparatus for a series-wound motor, having a field winding and an armature and having a circuit arrangement with phase gating control, wherein, during braking operation, the field winding is fed from the power supply system and the armature is shorted.

This braking apparatus is intended for a centrifuge, with the aim of keeping the braking torque constant over the entire rotation-speed range. The braking torque is controlled by a rotation-speed-dependent control device, with a current which is inversely proportional to the rotation speed of the electric motor being produced in the field winding of the electric motor. In addition, a braking resistor is also connected in series with the armature during braking operation.

EP 0 721 694 B1 describes an electrodynamic braking device for an electric motor, in which a power control element (4), which is connected in the main circuit of the electric motor, is connected in series, having a controller (5) which is connected to an input of the power control element and controls the motor current via the same power control element during motor or braking operation, and having a first changeover switch (13) for the armature (1) of the electric motor, with a second changeover switch (14) being connected in parallel with the armature such that the circuit which is formed by a first contact (9, 10) of the second changeover switch (14) and the armature is interrupted during motor operation and is closed during braking operation, and such that the second changeover switch (14) has a further contact (9, 11) which connects the control input of the controller (5) to a power supply system terminal (P) during motor operation, and interrupts this connection during braking operation.

In this solution, the braking current is intended to be defined via a braking resistor (15), and the field current which is drawn from the power supply system is used to produce the magnetic field for creating the braking torque, and in this case the field current is intended to be a pulsating direct current during braking, by being triggered only in every second half-cycle.

It is stated that the controller (5) controls the braking current in accordance with a predetermined field current profile, and/or that the controller (5) detects the braking current and keeps it constant by adjustment of the field current.

DE 102 34 397 A1 describes a braked series-wound motor and a method for braking the series-wound motor, according to which the series-wound motor is operated as a conventional series-wound motor during motor operation, with means for switching to braking operation allowing the armature and external excitation of a field winding to be bridged by the supply voltage, as a result of which the motor is operated as an externally excited direct-current generator for braking.

DE 28 42 145 describes a circuit arrangement for electrical braking of universal motors. When motor operation is switched off, braking operation is initiated, with the field winding still being fed from the power supply system and with the armature either being shorted or having current passed through it in the opposite direction, and with the motor being disconnected from the power supply system by a delay switch when it becomes stationary.

DE 103 17 636 A1 describes a braking device for a universal motor, in which a shorting switch (30) (triac) is provided for shorting the armature winding (18) during braking operation, with the shorting switch having a control input for determining its switching state, and with the control input of the shorting switch (30) being connected to a control unit (28) in order to carry out phase gating control of the shorting switch (30) in order to avoid brush sparking, during braking operation.

The known electrodynamic braking devices are not sufficiently suitable for the intended application.

SUMMARY OF THE INVENTION

Therefore, the invention is based on the object of providing an effective and cost-effective electrodynamic braking device for a universal motor, which results in good braking with reduced brush sparking and little brush wear and which, by means of an appropriate circuit arrangement, ensures operationally reliable monitored braking operation and motor operation, in order to allow a braking device such as this to be used for a machine which is fitted with a dangerous tool.

The advantages of the invention are seen in particular in that smooth rapid braking of the universal motor is achieved, with a long brush life, without reversing the polarity of the field winding or of the armature. The armature is shorted during braking operation, and the field winding is excited from a power supply system by a specific form of control during braking operation. The smooth rapid braking is achieved predominantly using simple hardware and specific software, as a result of which the electrodynamic braking device is cost-effective.

Brush sparking on the commutator of the armature is reduced during braking operation in particular by the controller for the control electronics containing a program which suppresses the damaging build-up of an increased arc on the commutator.

Furthermore, the braking device has apparatuses for reliable identification of motor operation and braking operation, as well as monitoring of the operational reliability of the control electronics and of the circuit arrangement.

BRIEF DESCRIPTION OF THE DRAWINGS

The invention will be explained in more detail in the following text with reference to the drawing, in which.

DETAILED DESCRIPTION

Electrical handheld tools which are fitted with a dangerous tool, such as handheld circular saws and angle grinders, have until now been braked by a mechanical brake or by an electronic braking device.

In particular, a mechanical brake has the disadvantage that a brake such as this is subject to not inconsiderable wear and therefore requires maintenance, and previously known electronic braking devices have the considerable disadvantage that the brushes and the commutator in the normally used universal motors are subject to heavy wear during braking operation.

FIGS. 1 to 4 each show a circuit arrangement for a universal motor, by means of which shorting braking can be carried out depending on the power supply system, without the brushes being subjected to significant wear.

Figure 1:
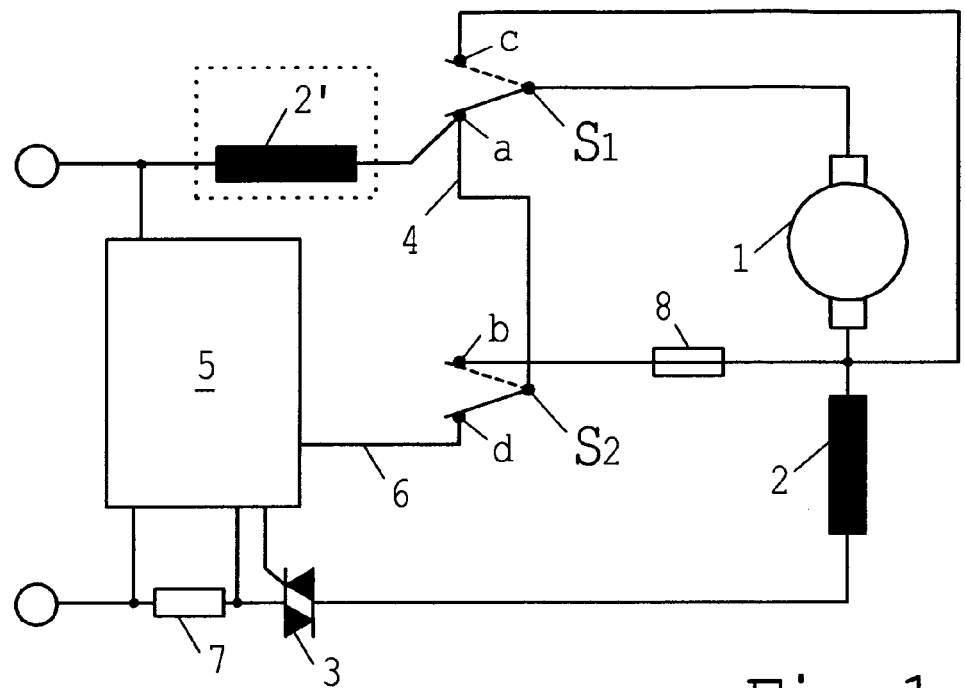
FIGS. 1 to 4 show circuit arrangements of the electrodynamic braking device for a universal motor.

FIG. 1 shows a circuit arrangement in which a first power supply system connection leads to the motor operating contact a of a first switching element S1, and a first connection of an armature 1 is connected to the first switching element S1, and a second connection of the armature is connected to a first connection of a field winding 2, and a triac 3 is connected between a second connection of the field winding and a second power supply system connection. The second connection of the armature 1 and the first connection of the field winding 2 are connected to a brake operating contact b of a second switching element S2 and to a brake operating contact c of the first switching element S1, with the second switching element S2 being connected via a link 4 to the motor operating contact a of the first switching element S1. An identification contact d of the second switching element S2 is connected to control electronics 5 by a line 6. The switching elements S1, S2 have at least one switching delay with a time of one half-cycle of a power supply system, in order to ensure safe switching from motor operation to braking operation.

In this case, one side of the armature 1 is connected in series with the field winding 2. The armature can also be connected between the field winding, in which case one field winding part 2' is then connected directly to the power supply system.

A shunt 7 is provided here for controlled braking operation, and a fuse 8 can be connected in series with the field winding 2 during braking operation, for the situation in which the electronic device has failed.

The circuit arrangement in FIG. 1 can also be provided only with the second switching element S2, in which case one side of the universal motor is then connected directly to the power supply system, and the first switching element S1 is therefore not required. For safety reasons, the fuse 8 is then connected in series with the universal motor.

The electrodynamic braking device operates as follows. When motor operation is initiated, then the first switching element S1 is closed to the motor operating contact a and the second switching element S2 is closed to the identification contact d. When the switching elements are in this switched position, the universal motor is activated for motor operation, and preferably accelerates via smooth starting.

When the motor is switched off, then the first switching element S1 is closed to the brake operating contact c, and the second switching element S2 is closed to the brake operating contact b. The field winding 2 is now connected directly via the triac 3 to the power supply system, and the armature is shorted via the brake operating contact c of the first switching element S1 and via a link. When the identification contact d of the second switching element S2 is open, a controller for the control electronics 5 activates a program for braking operation, by which means the triac 3 is operated such that a current whose magnitude is predetermined flows via the field winding 2. The rotating, shorted armature 1 is correspondingly excited by a field applied to the stator. A voltage is applied to the field winding 2 by means of the program for the controller of the control electronics 5, thus resulting in very little brush sparking, and achieving very effective braking.

When the aim is to switch safely from motor operation to braking operation by means of an appliance switch with non-delayed switching elements, and the armature is in this case intended to be mechanically disconnected from the power supply system on both sides, three triacs are required for this purpose.

Figure 2:
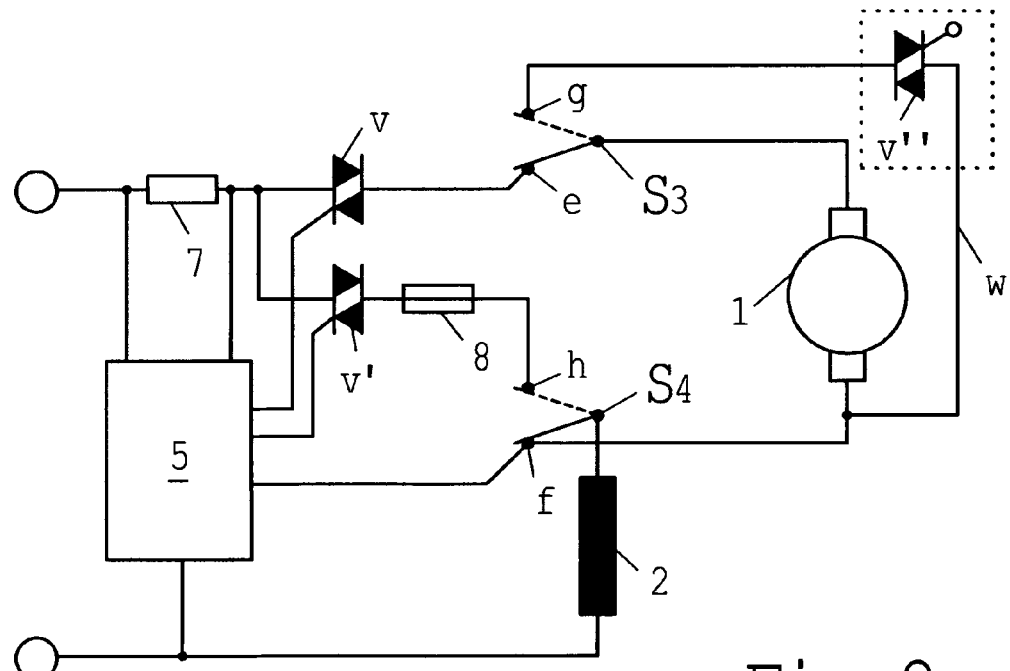

FIG. 2 shows a solution such as this. A first triac v is connected to the first power supply system connection and to a motor operating contact e of a first switching element S3, and the first connection of the armature 1 leads to the first switching element S3, with the second connection of the armature being connected to an identification contact f of a second switching element S4, and to a brake operating contact g of the first switching element S3, with the identification contact f also being a motor operating contact, at the same time. One connection of the field winding 2 is connected to the second switching element S4, and the other connection of the field winding is connected to the second power supply system connection, with a second triac v' being connected to a brake operating contact h of the second switching element S4, and to the first power supply system connection.

With this circuit arrangement, the armature is mechanically disconnected from the power supply system on both sides by the switching elements S3, S4 during braking operation and when motor operation is in the switched-off position. However, this does not ensure safe switching from motor operation to braking operation since the final half-cycle of the power supply system during motor operation can flow via an arc to the contacts of the switching elements, and via the shorting link w of the armature directly via the field winding, as a result of which the first triac v remains switched on until the next zero crossing, thus resulting in a high current flowing via the field winding, which results in a considerable arc on the commutator of the shorted armature, and this large current flow can also blow a power supply system fuse, via the field winding.

An arc on the switching contacts of the appliance switch is not extinguished until the next zero crossing of an AC voltage. In order to prevent the final half-cycle of motor operation being able to flow directly via the field winding while switching to braking operation, a third triac is provided for this purpose. This triac v" is connected to the shorting link w of the armature.

As can be seen from the circuit arrangement in FIG. 2, after switching from motor operation to braking operation, the armature 1 is disconnected from the power supply system on both sides by the two switching elements S3, S4, and the field winding 2 is disconnected from the power supply system by the second triac v' after the end of braking operation.

The armature 1 can also be completely disconnected from the power supply system after switching to braking operation when only one triac is provided. A two-pole changeover switch with delayed switching elements with the time of at least one half-cycle is required for this purpose.

Figure 3:
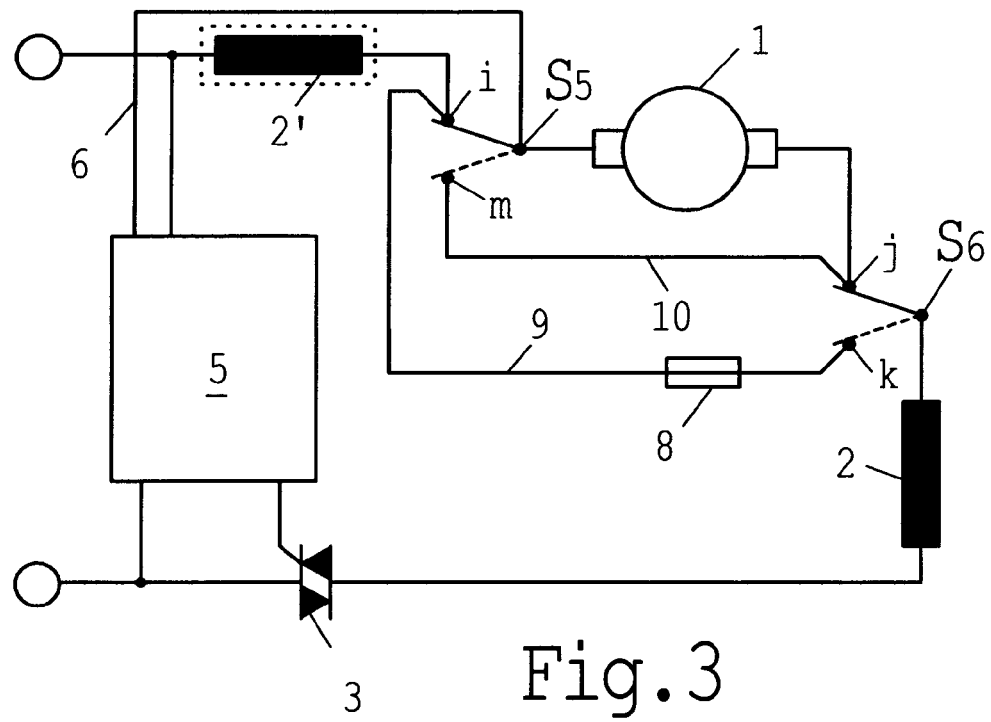

FIG. 3 shows a solution such as this. One power supply system connection leads to the motor operating contact i of the first switching element S5, and one connection of the armature 1 is connected to the first switching element S5, with the other connection of the armature 1 being connected to the motor operating contact j of the second switching element S6, and one connection of the field winding 2 being connected to the second switching element S6, with the other connection of the field winding leading to the other power supply system connection via the triac 3. The brake operating contact k of the second switching element S6 is connected via a link 9 to the motor operating contact i of the first switching element S5, and the motor operating contact j of the second switching element S6 is connected via a link 10 to the brake operating contact m of the first switching element S5.

The connecting line 6 of the control electronics 5 is in this case connected to the switching element S5, in order to identify the switch position. One side of the armature 1 is connected in series with the field winding 2, or the armature is connected between the field winding, in which case one field winding part 2' is then connected directly to the power supply system.

In FIGS. 1 to 3, the field winding of the universal motor is disconnected from the power supply system only by a triac when the appliance switch is in the switched-off position. Greater operational reliability is ensured by additionally also mechanically disconnecting the universal motor from the power supply system.

Figure 4:
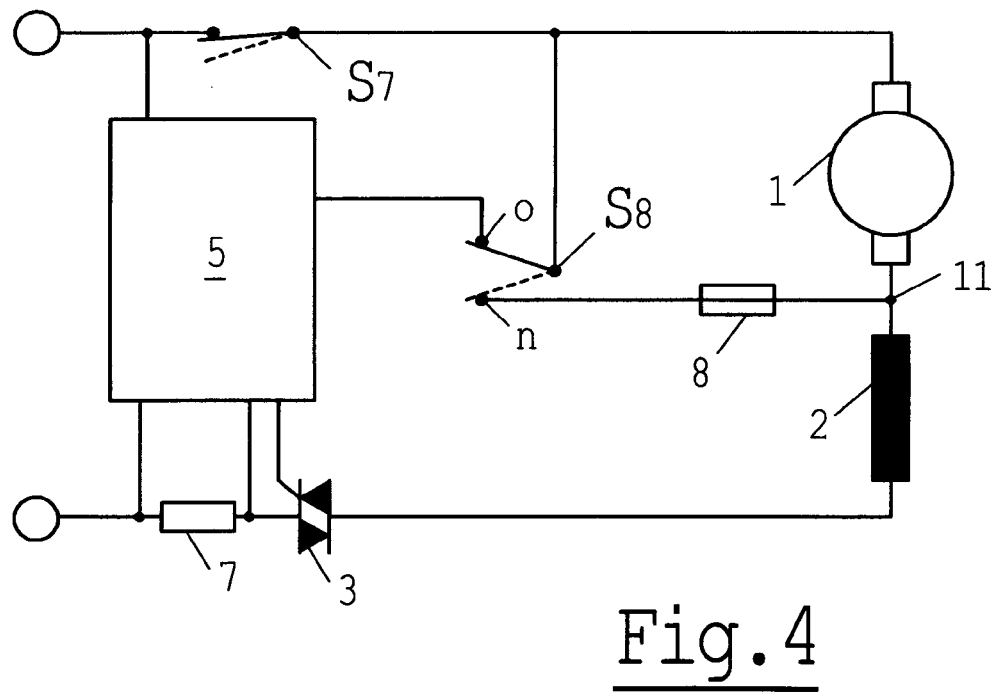

FIG. 4 shows a solution such as this, in which a switching element S7 disconnects a power supply system connection after the end of braking operation. In this case, one side of the armature 1 is connected in series with the field winding 2, and a switching element S8 is connected in parallel with the armature 1, with the switching element S8 and one connection of the armature being connected to one power supply system connection, and with the brake operating contact n of the switching element S8 being connected to the other connection of the armature and to one connection of the field winding, and therefore being connected to tap 11, with an identification contact o of the switching element S8 being connected via a line to the control electronics 5. The triac 3 is connected downstream from the motor. In this case as well, a shunt 7 is connected for control of the motor, and a fuse 8 is provided for operational safety during braking operation.

The switching element S8 has at least one switching delay with a time of one half-cycle, and the power supply system disconnecting switching element S7 has a switching delay of at least the duration of braking operation.

In order to allow smooth rapid braking by means of an electrodynamic braking device to be carried out with a universal motor in which the field winding is connected to the power supply system and the armature winding is shorted during braking operation, a very specific program is provided for the controller for the control electronics.

In the case of a braking device such as this, it is necessary to take account of the fact that, when AC voltage is used to pass a current through the field winding, the field which is present at the stator is not in time with the induced field at the armature. The magnitude of the shift is dependent on many factors. In order to compensate for a time shift in the field of the armature, braking resistors are connected in the braking circuit, for example. A braking resistor will, however, need to be variably controllable in order to allow it to be fully effective.

However, in principle, this complexity is not used for a universal motor for electric tools since the space required for a device such as this is not available, and the cost factor is much too high.

According to the invention, approximate synchronism is intended to be achieved between the field of the stator and the armature by specific control electronics.

This method will be explained in more detail using schematic graphic illustrations and a diagram and recordings.

Figure 5:
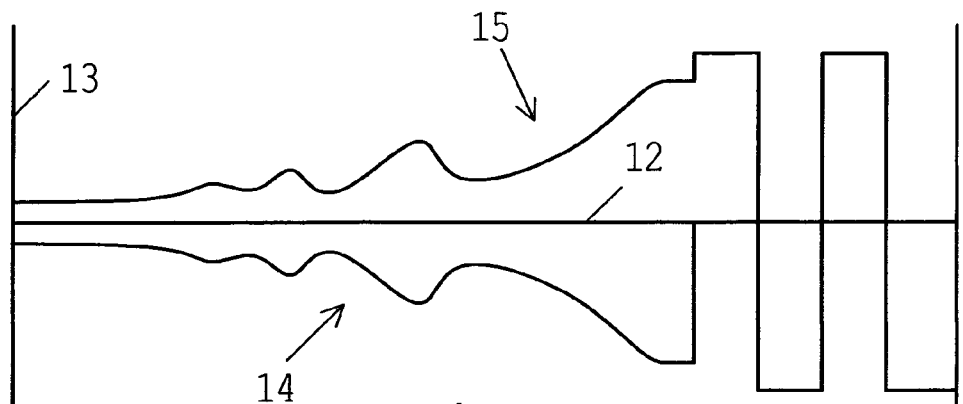
FIGS. 5 to 10 show symbolic graphic illustrations, diagrams and recordings of a current-voltage profile in the field winding during braking operation.
Figure 6:
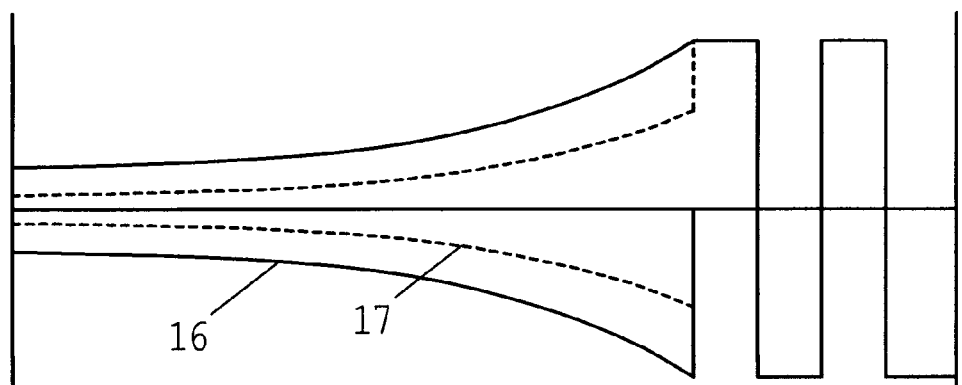
Figure 7:
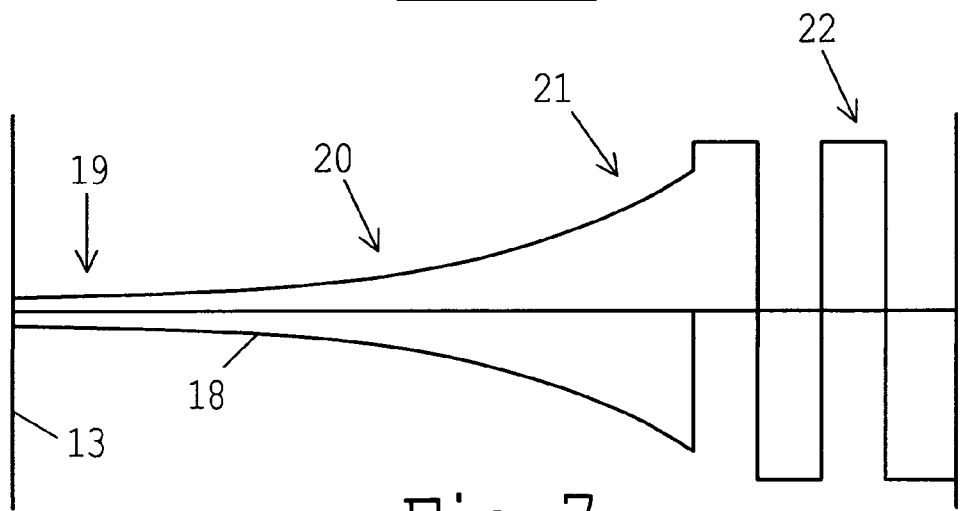

The zero crossing of a power supply system AC voltage is represented by solid lines 12 in FIGS. 5 to 7, and the magnitude of the current drawn by the field winding during braking operation is in each case shown at the side of this line 12.

FIG. 5 shows a schematic illustration of the current profile in the field winding during braking operation when the triac is operated, starting with a large trigger angle and subsequently with a trigger angle which continuously decreases uniformly.

At the start 13 of braking operation, a small field current flows via the field winding, which then rises slightly, rises in a subsequent first area section 14, and the field current falls in the form of a wave, and the field current rises continuously in a subsequent, second area section 15. In order that rapid braking is carried out at the end of braking operation and the universal motor can become stationary, toward the end of braking operation, the field winding is excited using an alternating current at a lower frequency than the power supply system frequency, and this alternating current consists of positive and negative half-cycle packets. The frequency of the half-cycle packets is preferably less than 10 Hz.

The rise and fall of the field current in the field winding causes considerable rush sparking on the commutator of the shorted armature.

It is not advantageous to pass current through the field winding with half-cycle packets or with a pulsating direct current throughout the entire braking time, since this results in the brush wear being considerable.

On the one hand, FIG. 6 shows a situation in which the overall current drawn by the field winding during braking operation is too high, and on the other hand the situation in which the current drawn is too low, characterized by a current curve 16 and by a dashed current curve 17.

In order to ensure that the same current curve can always be achieved during braking operation, provision is made for the current drawn by the field winding to be controlled.

FIG. 7 shows a controlled current curve 18 such as this. At the start 13 of braking operation, the field winding starts to draw alternating current at the power supply system frequency and at a permanently set low value, and in the further course of braking operation, in the area sections 19, 20, 21, this value is increased continuously to the start of the half-cycle packets 22. The current is controlled via a shunt 7 in the circuit arrangement, which shunt 7 is evaluated by the controller for the control electronics 5, and the triac 3 is operated appropriately by the program for the controller. At the same time, the torque during motor operation can also be controlled via the shunt 7, in the event of a reduction to the no-load rotation speed of the universal motor. Over loading of the universal motor and stalling of the electric tool can also be determined well via the shunt 7. In a situation such as this, the current supply to the universal motor is appropriately reduced, or is entirely suppressed by the control electronics 5.

The controller for the control electronics 5 contains an appropriate program and appropriate data for braking operation, thus resulting in smooth rapid braking with as little brush sparking as possible.

Figure 8:
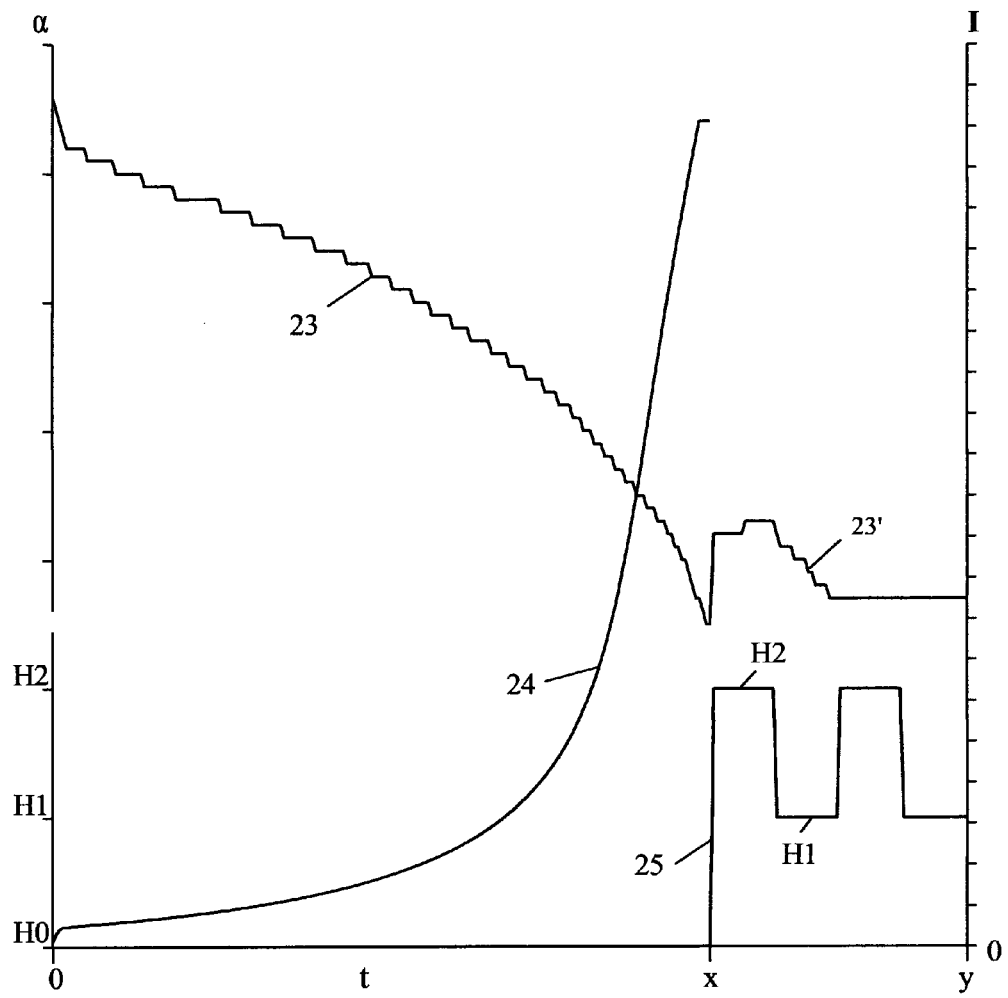

FIG. 8 shows a diagram of control curves and control data for a program for the controller for the control electronics. A table of a control curve for the phase gating angle for braking operation is represented by a first and a second phase gating angle curve 23, 23', and the data for a current nominal value is represented by a current nominal value curve 24, with the phase gating angle curve 23 being chosen such that the current nominal value curve 24 is achieved in principle. Discrepancies from the current nominal value curve 24 are corrected by a current regulator. An appropriately designed universal motor does not need a current regulator. The current nominal value curve 24 can also be achieved without the phase gating angle curve 23 by means of the current regulator, by presetting a phase gating angle for the current regulator at the start of the current nominal value curve 24. The program for the controller for the first phase gating angle curve 23 is active at the start of braking operation in a time from 0 to x (H0), with an alternating current corresponding to a power supply system frequency being applied to the field winding. The program for the controller for the second phase gating angle curve 23' is active at the end of braking operation in a time from x to y for half-cycle control, and an alternating current at a lower frequency than the power supply system frequency is applied to the field winding, corresponding to the half-cycle packets H2 and H1, represented by a half-cycle control curve 25. In this case, the half-cycle packets are uncontrolled, although the half-cycle packets can also be controlled. The half-cycle control curve 25 is predetermined by the second phase gating angle curve 23'. The half-cycle packets H1 may be positive, in which case the half-cycle packets H2 are then negative, or the half-cycle packets H1 may be negative, in which case the half-cycle packets H2 are then positive.

In order to keep brush sparking, and therefore brush wear low during braking operation in a universal motor without brush adjustment, braking operation must in principle be carried out using an alternating current at a power supply system frequency thus minimizing the brush wear. Field excitation with direct current or with pulsating direct current causes high brush wear. Since the field excitation is obtained from a power supply system with a shorted armature for braking operation, the braking process is difficult to control when the aim is to achieve reduced brush sparking with the same braking time. Therefore, the phase gating angle steps are less than 1% in the predetermined phase gating angle curves 23, 23', in which case, even in this case, large fluctuations in the current drawn for field excitation can still occur, causing considerable brush sparking. Greater fluctuations in the current drawn by the field winding are therefore prevented by the predetermined current nominal value curve 24. In addition, the predetermined current nominal value curve 24 results in the braking time remaining constant when the brushes become worn and the brush contact pressure is thus reduced.

Figure 9:
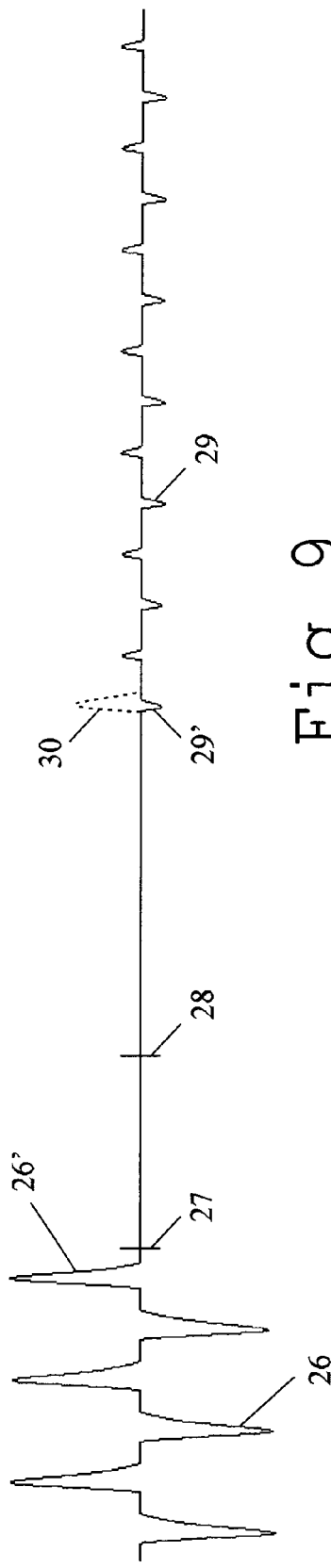

FIG. 9 shows a recording of a current profile of gated full-cycles of the power supply system during a transition from motor operation to braking operation. No-load operation of the universal motor is represented by gated full-cycles 26 of the power supply system. Switching takes place from motor operation to braking operation at a marking point 27, and the switching elements of the appliance switch have been lifted off the motor operating contacts. The switching elements of the appliance switch are in contact with the brake operating contacts at a marking point 28. Here, the switching elements therefore have a switching delay of approximately four half-cycles. Within the switching delay of the switching elements, the controller for the control electronics switches over from motor operation to braking operation. After about six half-cycles, the braking program commences large gating of the half-cycles 29 of the power supply system, although the braking program can also start earlier. The program for the controller is thus designed such that a first half-cycle 29' for braking operation is always of the opposite polarity to the polarity of the last half-cycle 26' of motor operation. If motor operation is ended with a positive half-cycle, then braking operation starts with a negative half-cycle, and if motor operation ends with a negative half-cycle, then braking operation starts with a positive half-cycle. This change in half-cycles is necessary since, if the half-cycles during the change from motor operation to braking operation have the same polarity the flow of current in the first half-cycle through the field winding at the start of braking operation can be very high, characterized by the dashed half-cycle 30, causing a not inconsiderable arc on the commutator of the armature. This high current flow in the first half-cycle 29' of braking operation is caused by the magnetic remanence in the iron of the stator poles having the same polarity as the last half-cycle 26' during motor operation, with the stator poles therefore being premagnetized.

Figure 10:
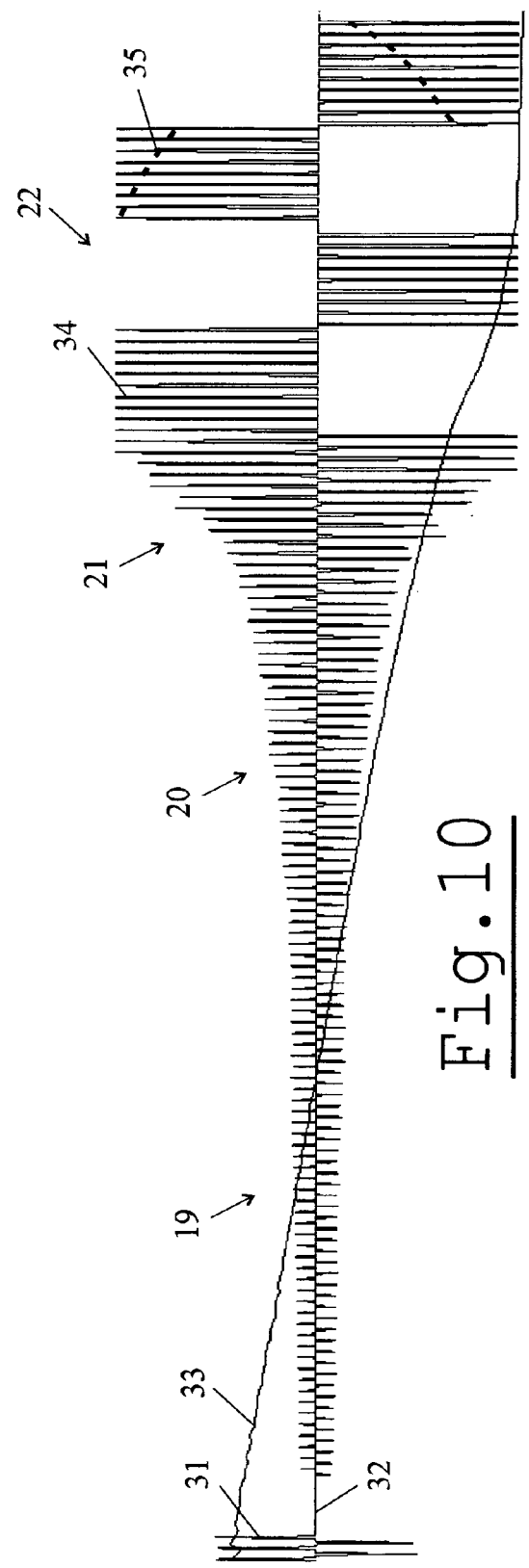

FIG. 10 shows a recording of a current profile in the field winding during braking operation. No-load operation is represented by a recorded current of gated full-cycles 31, and there is at least one zero crossing between switching from power supply system operation to braking operation. After the time 32 for switching from motor operation to braking operation, the current drawn in the field winding is initially low, with the current in the power supply system subsequently rising only slightly continuously in the first area section 19, rising somewhat more strongly in the second area section 20, and rising steeply in the third area section 21, with the rotation-speed curve 33 in consequence having an approximately linearly falling profile, as a result of which the rotation speed of the universal motor decreases continuously and uniformly during braking operation. In the fourth area section 22, the alternating current is drawn in the field winding at a low frequency, as a result of which positive and negative half-cycle packets are present on the field winding. The rotation speed of the universal motor decreases continuously and uniformly during braking operation as far as the half-cycle packets, and the half-cycle packets cause the motor to quickly become stationary. The half-cycle packets always change their polarity sequence when the universal motor is switched on again, in that the first half-cycle packet 34 has positive half-cycles during one braking process, and has negative half-cycles during a subsequent braking process, thus achieving uniform wear of the brushes. Half-cycle packets must therefore be applied to the field winding of the universal motor until the end of braking operation since the universal motor is driven until the end of braking operation when an alternating current at the same frequency as the power supply system is applied to the field winding.

Because the inductive field of the armature may be higher than the induced field, depending on the condition of the universal motor at the end of the braking time, the field which is present at the field winding can drive the armature of the universal motor until the end of the braking time. It may therefore be expedient to greatly reduce the current drawn by the field winding at the end of the braking time, characterized by a dashed line 35, or to disconnect it prematurely from the power supply system.

In order to reduce the brush wear even further in a universal motor which has been braked, the no-load rotation speed in the region of rated operation of the universal motor can be reduced, in which case the universal motor then has an associated rotation-speed detection device. A reduction in the no-load rotation speed is particularly advantageous for an angle grinder or a handheld circular saw, since this makes it easier to stop the tool safely. As soon as the tool is loaded, the torque is readjusted in accordance with the load on the tool.

The invention claimed is:

1. An electrodynamic braking device for a universal motor having a non-transitory computer readable medium including a program for switching from motor operation to braking operation, wherein, during braking operation, a field winding (2) of the universal motor is fed from a power supply system and an armature (1) is shorted, wherein the executable program in a controller in control electronics (5) contains data, for a first and a second phase gating angle curve (23; 23') and for a current nominal value curve (24) and for a half-cycle control curve (25), wherein the executable program in the controller is active for the first phase gating angle curve (23) at the start of a braking time (0 to x), and is chosen such that this results in the predetermined current nominal value curve (24), and an alternating current at a power supply system frequency is applied to the field winding (2), and the executable program in the controller is active for the second phase gating angle curve (23') at the end of the braking time (x to y) in order to produce half-cycle packets (22; H1, H2) and an alternating current at a lower frequency than the power supply system frequency is applied to the field winding (2).

2. The electrodynamic braking device as claimed in claim 1, characterized in that an actual current value for a current regulator for the control electronics (5) is determined via a shunt (7) during braking operation, and the current nominal value curve (24) is achieved by the current regulator via the phase gating angle curve (23).

3. The electrodynamic braking device as claimed in claim 1, characterized in that the current nominal value curve (24) is achieved directly by a current regulator, wherein a phase gating angle is predetermined for the current regulator at the start of braking operation.

4. The electrodynamic braking device as claimed in claim 1, characterized in that the half-cycle packets (22) are unregulated, and in that the current drawn by the field winding (2) is greatly reduced (35) at the end of the braking time.

5. The electrodynamic braking device as claimed in claim 1, characterized in that a control curve of the phase gating angle curves (23, 23') as well as control data for a current nominal value of the current nominal value curve (24) are formed using a table.

6. The electrodynamic braking device as claimed in claim 1, characterized in that there is at least one zero crossing of the power supply system between switching from motor operation to braking operation, in that a first half-cycle (29') in braking operation is of opposite polarity to the polarity of a last half-cycle (26') during motor operation, in that half-cycle packets (22) always change a sequence of their polarity when the universal motor is switched on again, in that a first half-cycle packet (34) has positive half-cycles during braking, and has negative half-cycles during subsequent braking.

7. The electrodynamic braking device as claimed in claim 1, characterized in that a torque is present on the armature during braking operation, which torque has a profile to achieve an approximately linearly falling rotation-speed curve (33), wherein the current drawn in the field winding is initially low during braking operation and rises slightly continuously in a first area section (19) from then on, and rises somewhat more greatly in a second area section (22) and rises steeply in a third area section (21).

8. The electrodynamic braking device as claimed in claim 1, characterized in that an identification connection is associated with the control electronics (5) in order to identify motor operation and braking operation, and which identification connection leads to a switching element of an appliance switch, and the switching elements of the appliance switch have a switching delay of at least one time period of a half-cycle of the power supply system before the switching elements each make contact with a brake operating contact.

9. The electrodynamic braking device as claimed in claim 1, characterized in that an identification connection (6) of the control electronics (5) is directly connected to a power supply system connection via a switching element of the appliance switch during motor operation, or is connected to a power supply system connection via a switching element and the field winding (2, 2'), in that the armature (1) is disconnected from the power supply system on both sides by two delayed switching elements (S3, S4; S5, S6) after switching to braking operation, and the field winding (2) is disconnected from the power supply system by a triac after the end of braking operation.

10. The electrodynamic braking device as claimed in claim 1, characterized in that three triacs (v, v', v") are provided in a circuit arrangement for mechanical disconnection of the armature (1) on both sides by an appliance switch with non-delayed switching elements (S3, S4), and a first triac (v) is connected in series with the universal motor via a first switching element (S3) during motor operation, and a second triac (V') is connected in series with the field winding (2) via a second switching element (S4) during braking operation, and a third triac (v") is connected to a shorting link (w) of the armature (1).

11. The electrodynamic braking device as claimed in claim 1, characterized in that an actual current value for a current regulator for the control electronics (5) is determined via a shunt (7) during braking operation, and the excitation of the field winding (2) is achieved via the phase gating angle curves (23, 23').

12. The electrodynamic braking device as claimed in claim 1, characterized in that the half-cycle packets (22) are regulated, and in that the current drawn by the field winding (2) is greatly reduced (35) at the end of the braking time.

13. The electrodynamic braking device as claimed in claim 1, characterized in that a control curve of the phase gating angle curves (23, 23') as well as control data for a current nominal value of the current nominal value curve (24) are formed using a mathematical function of the executable program in the controller.

* * * * *

UNITED STATES PATENT AND TRADEMARK OFFICE
CERTIFICATE OF CORRECTION

PATENT NO. : 8,704,468 B2 Page 1 of 1
APPLICATION NO. : 13/254647
DATED : April 22, 2014
INVENTOR(S) : Hans Hermann Rottmerhusen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this
Twenty-ninth Day of September, 2015

Michelle K. Lee
*Director of the United States Patent and Trademark Office*